US008302470B2

(12) United States Patent
Earle

(10) Patent No.: US 8,302,470 B2

(45) Date of Patent: Nov. 6, 2012

(54) SYSTEM AND METHOD FOR TESTING FIRE PUMP FULL CAPACITY FLOW

(76) Inventor: John R. Earle, Churchton, MD (US)

( * ) Notice: Subject to any disclaimer, the term of this patent is extended or adjusted under 35 U.S.C. 154(b) by 556 days.

(21) Appl. No.: 12/655,052

(22) Filed: Dec. 22, 2009

(65) Prior Publication Data

US 2010/0163123 A1 Jul. 1, 2010

Related U.S. Application Data

(60) Provisional application No. 61/140,135, filed on Dec. 23, 2008.

(51) Int. Cl.
*G01F 15/02* (2006.01)

(52) U.S. Cl. .......................................................... 73/198

(58) Field of Classification Search .................... 73/196, 73/168, 861.63, 861.66, 861.42, 861.52
See application file for complete search history.

(56) References Cited

U.S. PATENT DOCUMENTS

| | | | | |
|---|---|---|---|---|
| 106,973 A | | 8/1870 | Wegmann | |
| 1,276,732 A | | 8/1918 | Darley | |
| 2,564,272 A | * | 8/1951 | Morton | 73/861.61 |
| 3,736,797 A | * | 6/1973 | Brown | 73/861.64 |
| 3,918,305 A | * | 11/1975 | Benedict | 73/861.61 |
| 4,047,668 A | | 9/1977 | DeWeese et al. | |
| 4,343,435 A | | 8/1982 | Anderton et al. | |
| 4,869,103 A | | 9/1989 | Jerman | |
| 5,069,073 A | | 12/1991 | Barrett | |
| 5,297,736 A | | 3/1994 | Vickery | |
| 5,804,716 A | | 9/1998 | McGuire et al. | |
| 6,095,429 A | | 8/2000 | Killgrove et al. | |
| 6,386,049 B1 | | 5/2002 | Schrumm | |
| 6,874,375 B1 | | 4/2005 | Grenning | |
| 7,017,406 B1 | | 3/2006 | Cressman | |
| 7,080,694 B2 | | 7/2006 | Boyle | |
| 7,137,568 B1 | | 11/2006 | LaCrosse | |

* cited by examiner

*Primary Examiner* — Jewel V Thompson

(74) *Attorney, Agent, or Firm* — Whiteford, Taylor & Preston LLP

(57) ABSTRACT

A flow test device for diminishing and diverting the flow of a high pressure stream of water while testing a fire pump has a hollow diverter tank supported on a trailer for receiving a high pressure stream of water forced by the fire pump through one or more pipes and nozzle tips retained in a stable position adjacent the diverter tank. Diffusers within the tank divert the flow of water as it enters the tank with the water subsequently exiting through an open bottom of the diverter tank. One or more support panels maintain the pipes in a generally horizontal orientation in relation to the diverter tank. A valve and gauge board enables a user to control the testing and provides for easy positioning in the vicinity of the fire pump to be tested while avoiding splash and spray from the diverter tank discharge.

16 Claims, 7 Drawing Sheets

SYSTEM AND METHOD FOR TESTING FIRE PUMP FULL CAPACITY FLOW

CROSS REFERENCE TO RELATED APPLICATION

This application is based upon and claims benefit of co-owned U.S. Provisional Patent Application Ser. No. 61/140,135 entitled "System and Method for Testing Fire Pump Full Capacity Flow", filed with the U.S. Patent and Trademark Office on Dec. 23, 2008 by the inventor herein, the specification of which is incorporated herein by reference.

BACKGROUND OF THE INVENTION

1. Field of the Invention

The present invention relates to water flow measuring devices, and more particularly, to water flow measuring devices for use with fire-fighting equipment such as fire hydrants or building fire pumps.

2. Background

In the construction of most buildings, UL and/or FM approved fire pumps are incorporated. The pumps provide water pressure for fire sprinklers, hydrants, or a standpipe system where the available source of water pressure is inadequate. Building sprinkler systems designed for extinguishing fires within the building and fire standpipes often carry extremely high water pressures. All approved fire pumps are constructed and factory tested pursuant to the National Fire Protection Association ("NFPA") regulations. Most state and local fire and building regulatory agencies, as well as insurance underwriters, have adopted the NFPA regulations or code for testing fire pumps.

It is necessary to test the water pressure in the building fire suppression systems periodically to meet fire and safety codes. The NFPA code requires field testing of each new pump and annual testing of existing pumps. Under supervision of local building and fire authorities, the pumps are tested with full water flow to verify that the pump, the supply piping, and the water source meet the design demand of the fire suppression system of the building.

To test a typical system, the sprinkler system or standpipe is usually connected to a hose and a playpipe to allow the free flow of high pressure water through the system and out the playpipe. Typically, temporary hoses are attached to an available connection and the water is released. A playpipe or flow diverter may be connected to the end of the hose to allow flow measurements at the exiting water stream. A measuring device, such as a pitot tube, determines the flow of water exiting the hose/playpipe. During pressure tests, water may be allowed to discharge from these systems for anywhere from a few minutes to half-an-hour or more.

The water discharged from the playpipe typically cannot be directed with any great specificity or accuracy to a particular area, but instead flows primarily outdoors in the immediate vicinity of the building that contains the system under test. The water is often discharged adjacent to the building wall or hydrant. Additionally, when water under high pressure is released to atmospheric pressure, considerable forces are in play on the discharge stream. High-pressure water spraying from the hose releases very strong forces that are difficult to control and tend to cause the hose and playpipe to swing from side to side and whip violently. Typically, the playpipe or flow diverter needs to be restrained during testing. Extreme care must be exercised with regard to where the water is discharged. The high-pressure water from the playpipe may dig holes in streets, driveways, parking lots, and lawns, with results very similar to hydraulic mining. Damage to the ground, surrounding landscaping, and harm to individuals in the path of the water can occur due to a misdirected water stream.

Building sites and crowded city locations rarely afford sufficient spray areas without interrupting traffic for long periods or without potential harm to pedestrians and nearby property. Many new pump installation tests are conducted on dirt pad sites of new building construction. Such sites typically cannot handle the high-pressure sprays and large volume of water runoff for the full duration of the flow test. Thus, the tests are often shorter in length than necessary and cannot provide accurate results because the tester is unable to provide flow for the appropriate time. Other sites may not have the physical space necessary to accommodate the full spray of water under high pressure without damage to surrounding property.

As safety codes and standards have improved over the years, accuracy in testing is of an increasing importance. To perform a flow test properly using current methods the following must take place.

1. Typically, three persons are required. One person is located at the fire pump inside the building performing tests, one person is located at the fire pump's flow test header on the building, and one person is located at the flow point of discharge. The person at the flow test header and the person at the flow point of discharge must communicate with each other to accurately adjust the flow pressure to required levels. When multiple flows are required to meet a certain demand, the task gets much more difficult. When the volume of one flow device is adjusted higher, the other flow devices decrease in volume, thus requiring much more time to set all flow devices to required pressures accurately.
2. The area at the flow point of discharge, the majority of the time, could exceed 30 yards in diameter. Bridge devices are sometimes used to stack flow discharge units where several units can flow at one location. However, in most conditions, more than three discharge flow devices are required thus making it difficult to accurately measure flows. The person at the flow point of discharge will need to walk back in forth from one test point to the other, communicating with the person at the flow test header to open or close valves to increase/decrease flows, back and forth several times to verify all flow points of discharge are reading the required pressures. After verification, the person at the flow point of discharge moves away from the test area allowing the person at the fire pump to perform tests. In some cases, the hose valves at the flow test header, due to heavy vibration, will slowly open creating inaccurate flows at the flow point of discharge. This is common, and the person at the test header must watch the valve handles to make sure this does not happen. Even when watching closely, if the handle moves in the slightest way, the flows are compromised. Having the person at the flow point of discharge not continuously watching the pressure gages because the person has moved from his position, can result in the flow test results not being accurate.
3. Having to move back in forth several times to measure flows at the point of discharge requires excessive time and excessive water usage.
4. The difficulty of providing unrestricted access to the test equipment is that water backsplash is difficult to control. The difficulty increases as the size of the device reduces. An unrestricted access flow diverter must allow the operator access to the measurement and control devices without getting him wet in the process. The device should prevent any backsplash of the fluid in the area where access is required. The person at the flow point of discharge, at 90% of the flow test locations, gets soaking wet from the knees down.

5. Excessive turbulence will greatly affect flow readings. Unfortunately, it is practically impossible to eliminate water turbulence. Fire hoses used are typically 2½-inch size. Any bends, curves, and/or kinks in any fire hose will create water turbulence thus resulting in inaccurate measurements.

There is a need for a high-pressure water testing apparatus that is easy to control; that dissipates the pressure from the system under test; and that is easy to use.

SUMMARY OF THE INVENTION

Accordingly, it is an object of the present invention to provide a flow capacity test device that avoids the disadvantages of the prior art.

Another object of the present invention is to provide a flow capacity test device that is effective and easy to use.

Yet another object of the present invention is to provide a flow capacity test device to improve testing accuracy. Another object is to provide a flow capacity test device enabling an easier means for testing fire pumps. A related object is to provide a flow capacity test device that saves costs and water.

Still another object of the present invention is to provide a flow capacity test device to be as maintenance free as possible, uses less area to flow water, decreases labor costs, increases productivity, and uses less water during testing.

These and other objects of the present invention are attained by the provision of a flow capacity test device having a diverter tank mounted on a portable trailer. A plurality of pipe sections connects to the diverter tank through pitotless nozzles having direct connections to a valve and gauge board. Support panels may be used to support and maintain alignment of the pipe sections between the diverter tank and the valve and gauge board. The diverter tank has an open bottom and includes one or more flow diffusers. A user at the valve and gauge board can control flow from a plurality of fluid sources and simultaneously measure the pressure while avoiding splash and spray from the diverter tank discharge.

BRIEF DESCRIPTION OF THE DRAWINGS

The above and other features, aspects, and advantages of the present invention are considered in more detail, in relation to the following description of embodiments thereof shown in the accompanying drawings, in which.

DETAILED DESCRIPTION OF PREFERRED EMBODIMENTS

Figure 1:
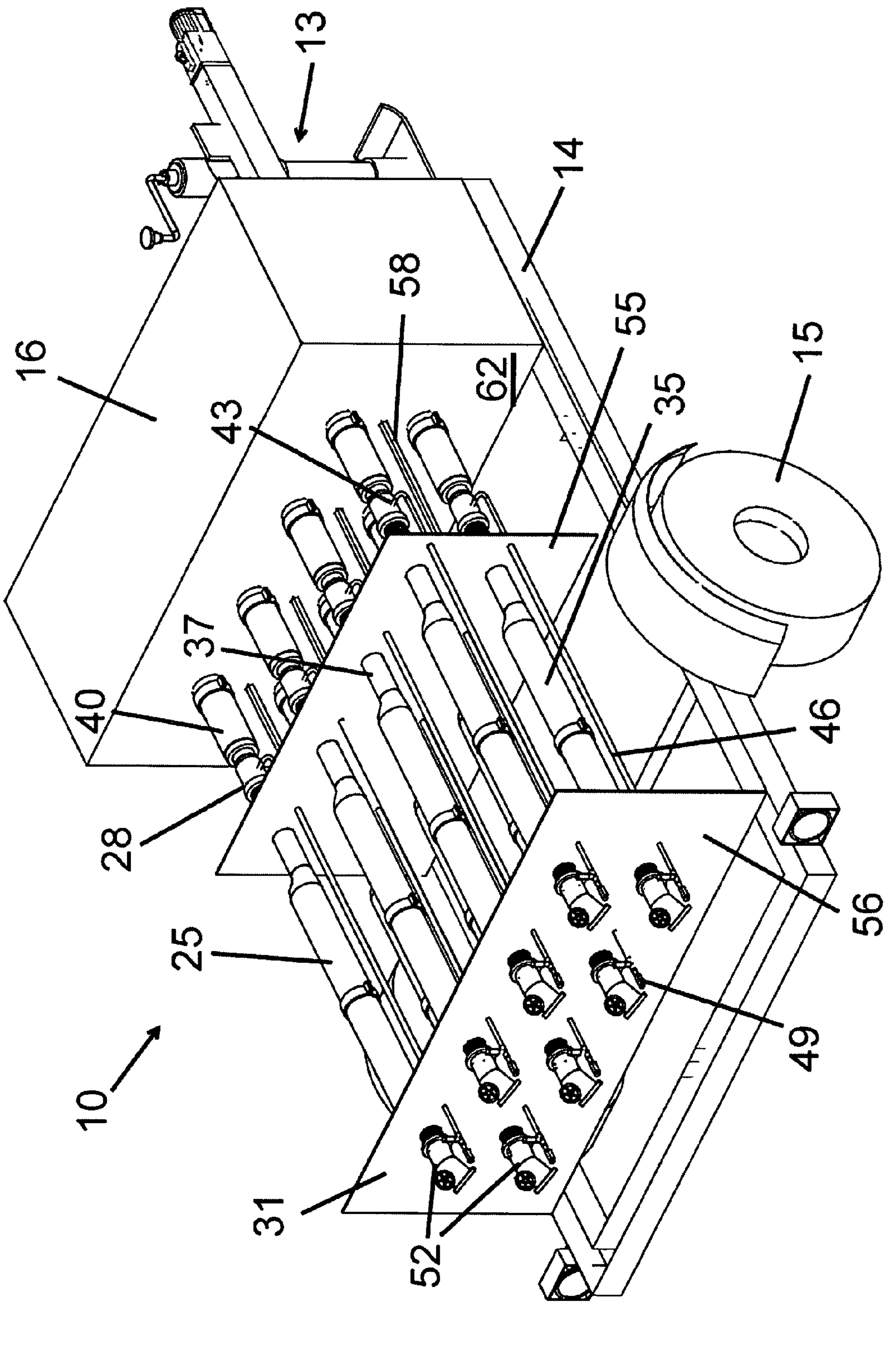
FIG. 1 is a rear perspective view of a flow capacity test device according to an embodiment of the present invention.
Figure 2:
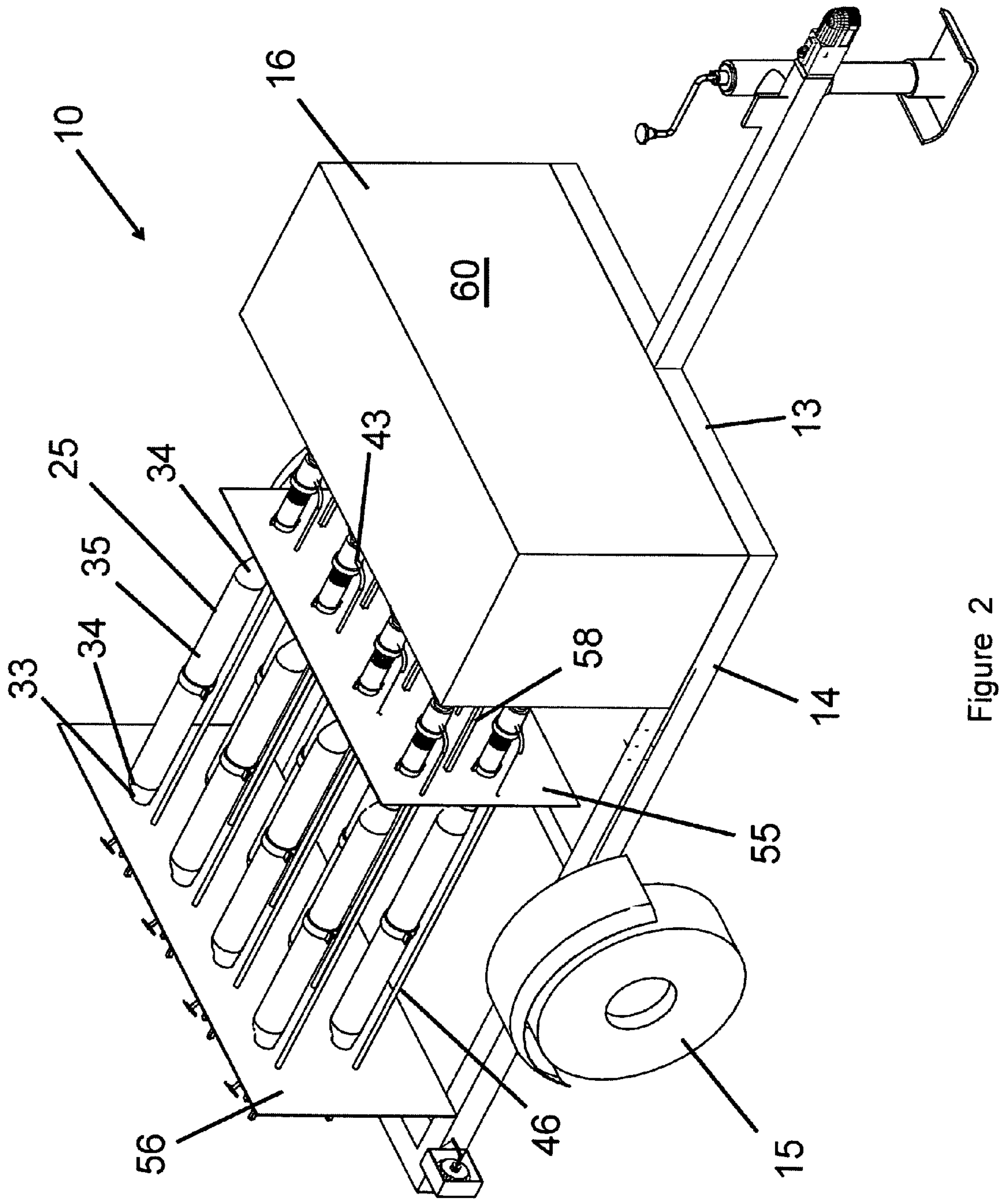
FIG. 2 is a front perspective view of a flow capacity test device according to an embodiment of the present invention.

The invention summarized above and defined by the enumerated claims may be better understood by referring to the following description, which should be read in conjunction with the accompanying drawings. This description of an embodiment, set out below to enable one to build and use an implementation of the invention, is not intended to limit the invention, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Referring to the drawings, FIGS. 1-4 shows a flow capacity test device, indicated generally as 10, according to the present invention. The test device 10 is mounted on a portable trailer 13 and has a diverter box 16. The portable trailer 13 enables accurate flow testing in any test location. In a preferred embodiment, the trailer 13 includes a frame 14 mounted on heavy payload tires 15 to support the weight of the test device 10.

The trailer 13 may include vertical barriers on three sides and a rear gate (not shown). The side barriers and rear gate may be selectively moveable between an open and a closed position. In some embodiments, the side walls of the trailer 13 may be constructed of heavy angle framing with expanded metal infills. Additionally, the rear gate, if included should have double door latched gates made of heavy angle framing and expanded metal. The floor of the trailer 13 may be made of heavy duty expanded metal, except under the diverter box 16.

Figure 3:
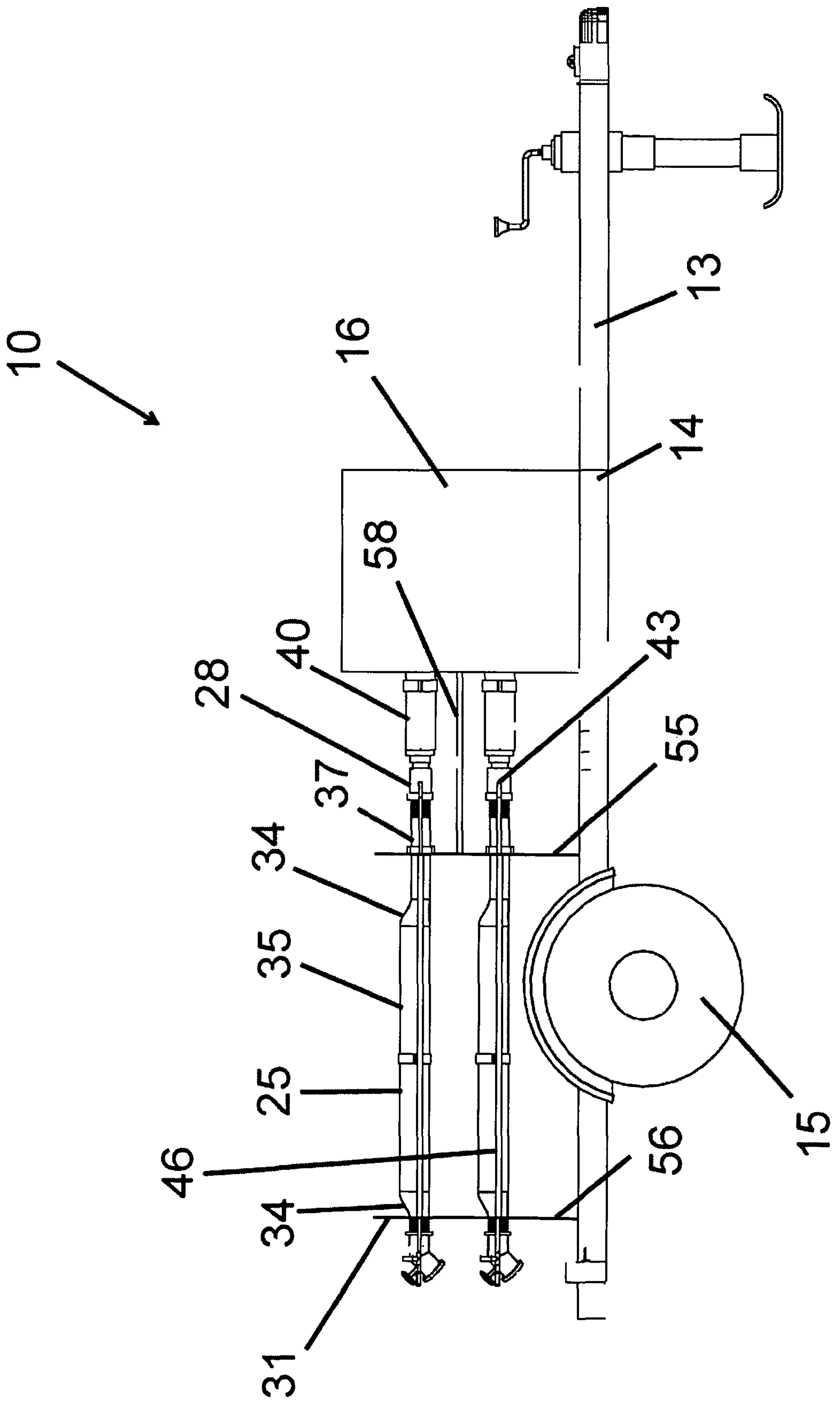
FIG. 3 is a side elevation view of a flow capacity test device according to an embodiment of the present invention.
Figure 4:
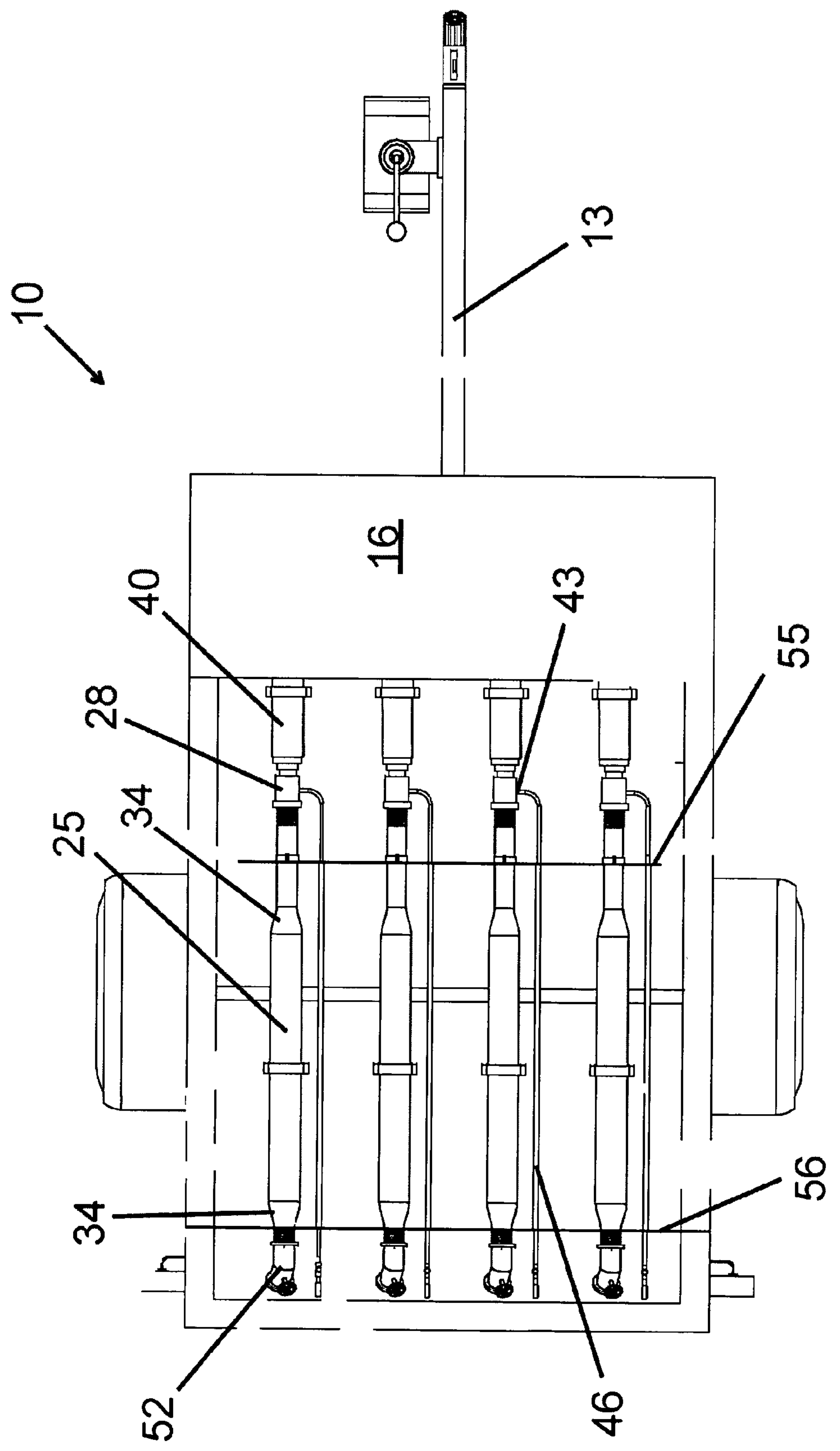
FIG. 4 is a top plan view of a flow capacity test device according to an embodiment of the present invention.
Figure 5:
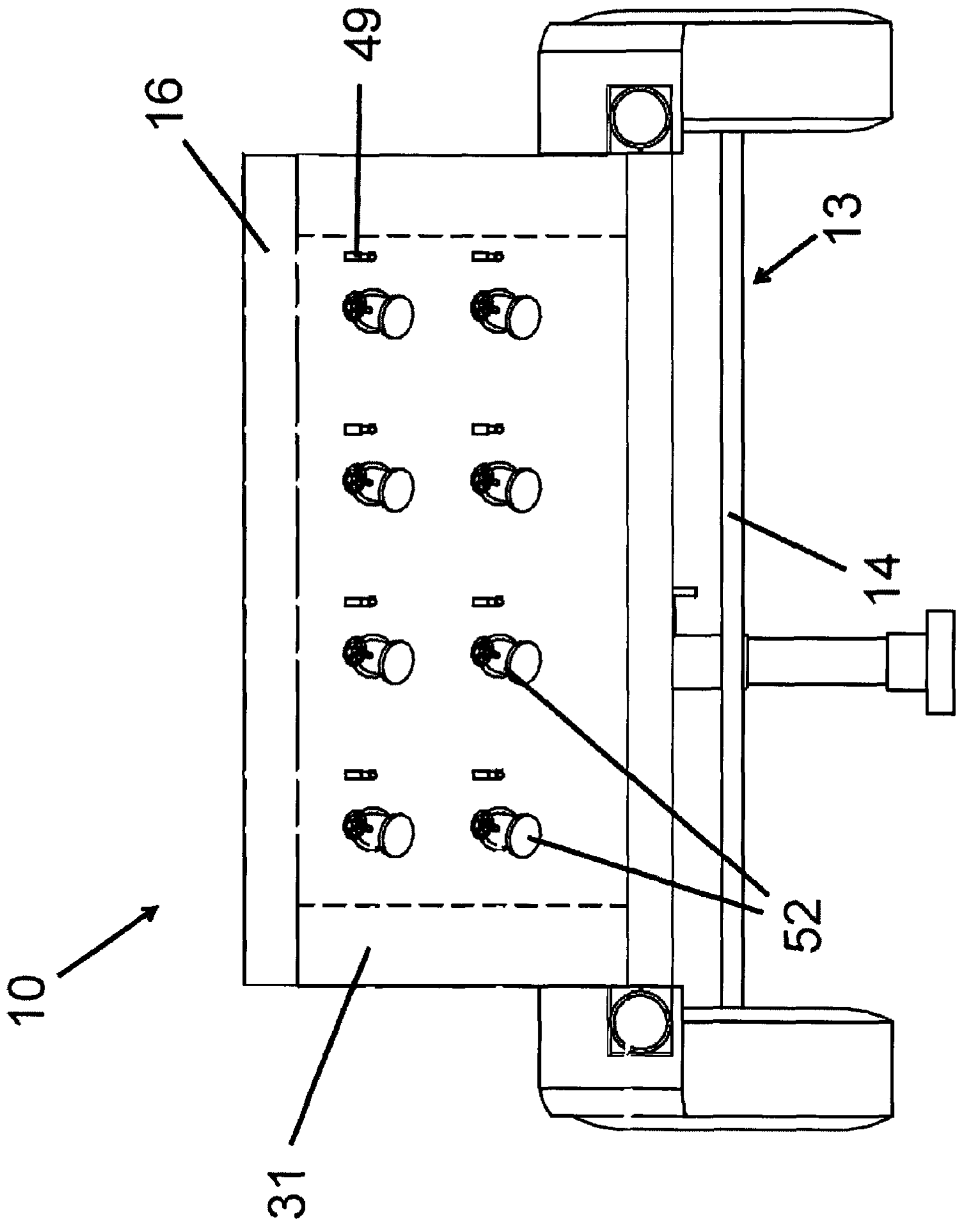
FIG. 5 is an elevational view of hose and gauge connection panel for a flow capacity test device according to an embodiment of the present invention.

Further included in the test device 10 are one or more fluid conduits 25. The conduit 25 is connected on one end to the diverter box 16 by a pitotless nozzle 28 and on the other end to a test header 31, best seen in FIG. 5. The conduit 25 between the pitotless nozzle 28 and the rear of the trailer's remote test header 31 has been designed to greatly reduce water turbulence from the fire hoses and valve 52 located on the trailer remote test header 31. Conduit 25 may be approximately seven feet of steel 2½-inch pipe with a smooth brass extension downsizing to an appropriate diameter for the pitotless nozzle 28. In a preferred embodiment, the fluid conduit 25 starts at the remote test header 31 with a 2½-inch diameter section 33 approximately 4 inches in length, then upsizes using a first 2½×4-inch eccentric reducer/expander 34 to an elongated 4-inch diameter section 35 approximately 35-inches in length, then reduces through a second 2½×4-inch eccentric reducer/expander 34 back to a 2½-inch diameter section 37 approximately 16 inches in length. (The change in diameters is best seen in FIG. 3.) In a preferred embodiment, the conduit 25 uses a smooth brass 2½-inch female NPT to hose threaded adapter to join the conduit 25 to the pitotless nozzle 28. The overall dimension of conduit 25 is approximately 67-inches in length. Other lengths and diameters may be used. This design removes approximately 95% of the water turbulence, thus allowing true flow readings. The increased pipe size and volume absorbs most of the turbulence and allows a smoother flow pattern prior to flowing through the pitotless nozzle 28. Also connected to the remote test header 31 are one or more 2½-inch valves 52 that can be connected to a fluid flow system for connecting the test device 10 to a hose from the system to be tested.

The test device 10 includes a pitotless nozzle 28 and insert 40. In a preferred embodiment a suitable pitotless nozzle 28 and insert 40 is manufactured by Hydro Flow Products, Inc. of Arlington Heights, Ill. The pitotless nozzle 28 includes a gauge port 43. Fluid enters the nozzle 28 as turbulent flow. As the fluid passes through the nozzle 28, the turbulent flow is converted to laminar flow due to the shape of the nozzle 28. Once in laminar flow, the pressure at that point in the nozzle is constant, and therefore the pressure, and thus flow rate, can be measured with greater accuracy. A pitotless nozzle is described in U.S. Pat. No. 6,874,375 to Grenning, the specification of which is included herein by reference, in its entirety. The design of the pitotless nozzle 28 keeps the measuring point out of the direct path of water flow, thus the possibility of damaging the unit by rocks, debris, etc. is not a factor. A gauge line 46 extends from the gauge port 43 on the pitotless nozzle 28 to the remote test header 31, shown in FIG. 5. A gauge connection 49 on the remote test header 31 is used to attach a pressure gauge (not shown) to indicate pressure, which can be correlated to flow in the conduit 25. One or more support panels 55, 56 prop up and maintain alignment of the fluid conduit 25 between the remote test header 31 and the diverter box 16. In some embodiments, one or more support bars 58 may extend between the support panel 55 and the rear wall 62 of the diverter box 16.

In a preferred embodiment, the diverter box 16 includes one or more flow diffusers 19. The diverter box 16 comprises a rigid enclosure with an open bottom 22. In some embodiments, the diverter box 16 comprises a steel enclosure approximately 30-inches long, 36-inches tall and 77-inches wide. A plurality of strengthening tubes 64 may extend between the front wall 60 and rear wall 62 of the diverter box 16.

Figure 6:
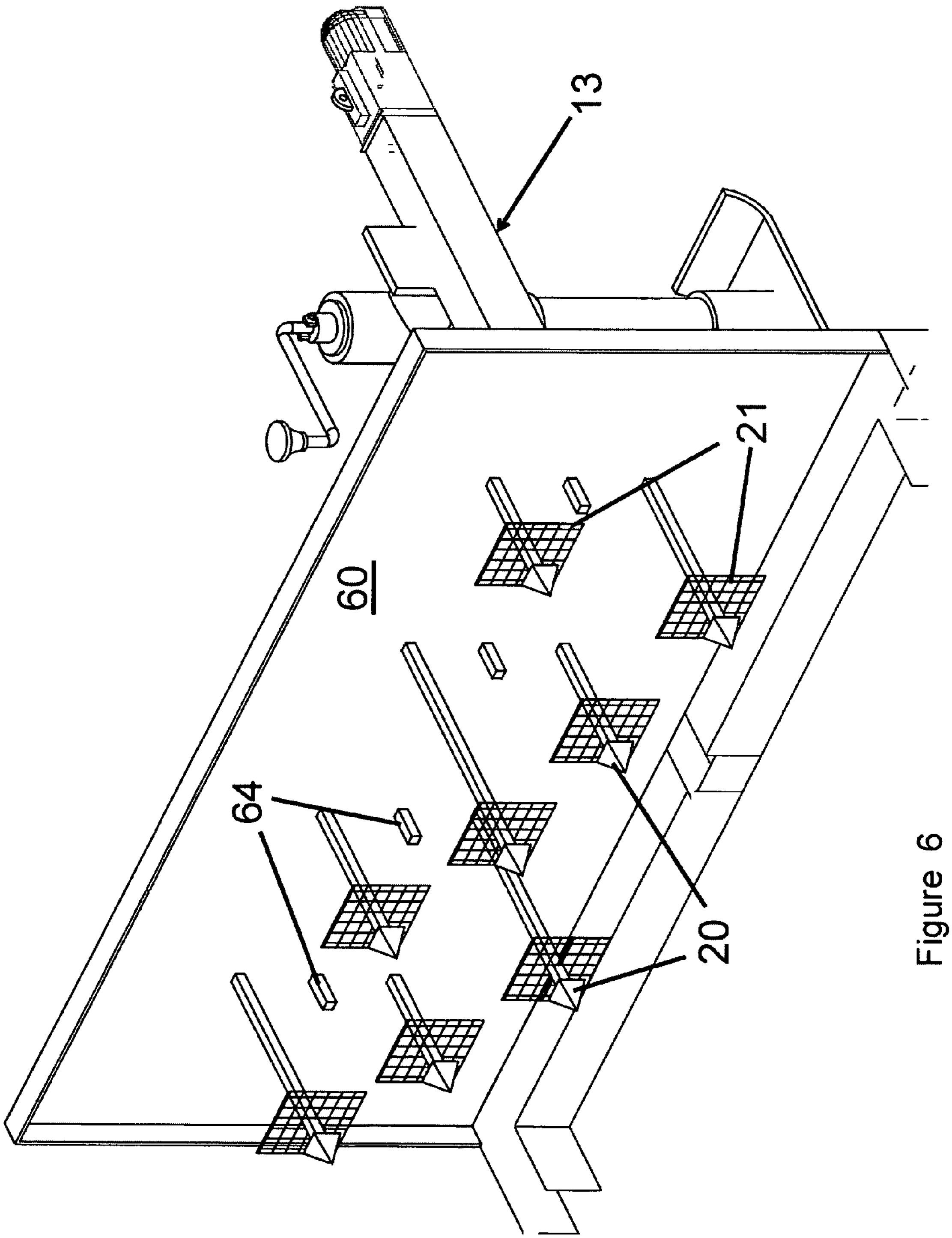
FIG. 6 is a perspective, cutaway view of the interior of a diverter box for a flow capacity test device according to an embodiment of the present invention.
Figure 7:
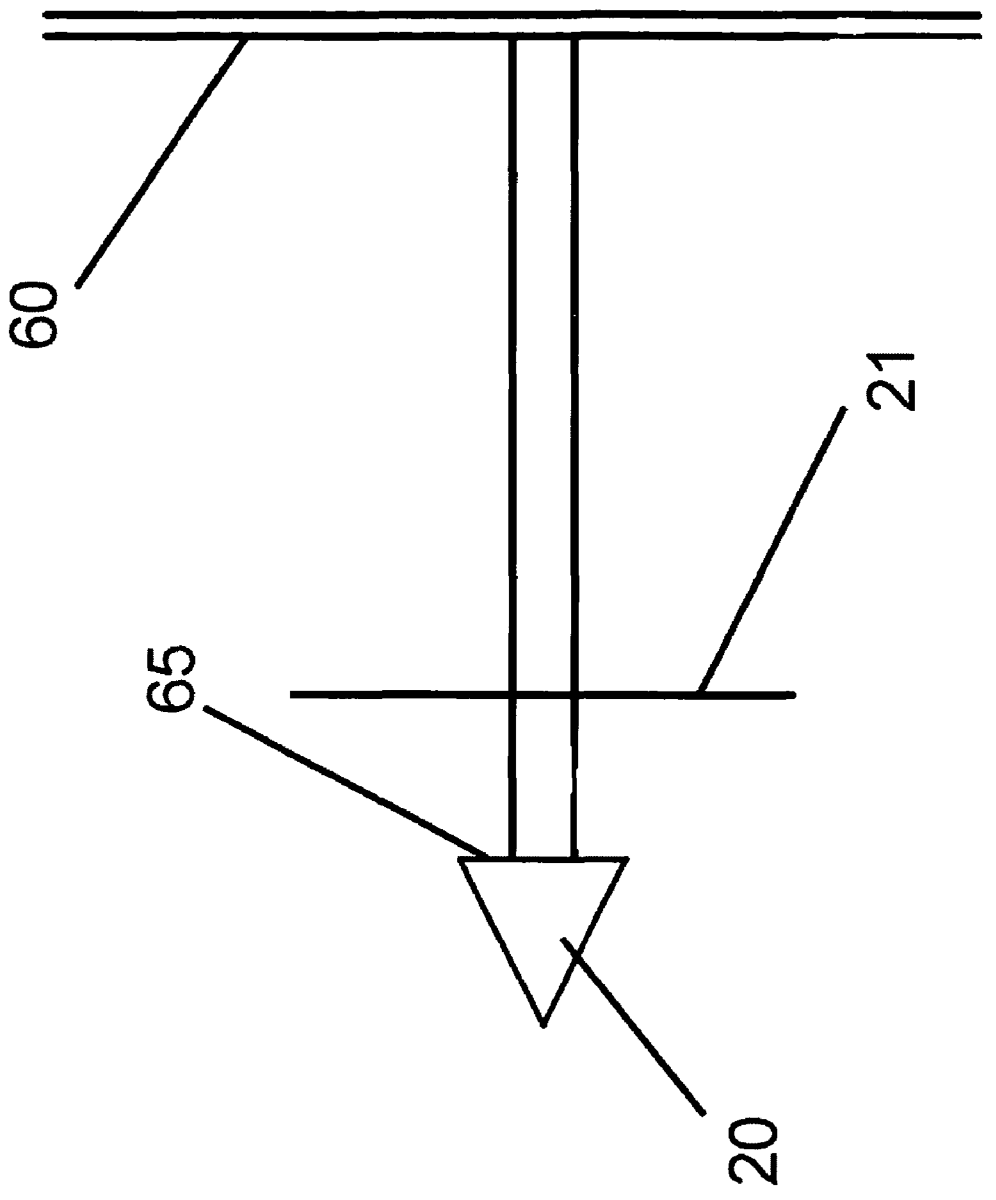
FIG. 7 is an enlarged view of a flow diverter for a flow capacity test device according to an embodiment of the present invention.

Referring to FIG. 6, the diverter box 16 is the water discharge area for flow testing. Inside the diverter box 16, in the direct path of each water flow, a flow diffuser 19 is placed. In some embodiments, the flow diffuser 19 includes a manufactured steel arrow shaped head 20 and a wire mesh portion 21 at each stream location. As shown in FIGS. 6 and 7, the arrow shaped head 20 may be formed by a rectangular pyramid approximately 2-inches on each side and 2-inches long. Preferably, the wire mesh portion 21 should be approximately 6-inches square located about 2-inches behind the base 65 of the arrow shaped head 20. The length of each of the plurality of flow diffusers 19 can vary from as short as about 10- or 11-inches to as long as about 18- to 22-inches. During test flows, the water is then distributed in numerous directions within the diverter box 16 and then directed downwards by gravity in a safe, less forceful manner.

Flows are measured through the pitotless nozzle 28 and inline unit 40. The inline unit 40 is used to eliminate vacuum problems during testing. The water gauge port 43 on the pitotless nozzle 28 is connected to a pressure gauge that may be connected at the gauge connection 49 at the rear of the trailer next to each hose valve 52. This will allow one person to adjust flows and observe flow pressure reading in one general location that is safe. This design will reduce labor costs because the third person is no longer required (person at the pumps test header), will ensure accurate testing because the person at the rear of the trailer (remote test header) is now capable of observing all pressure readings to ensure all flows are not disturbed or changed, being at one safe location the person is no longer subjected to water damage to self, testing area has been reduced considerably and now can be performed in tight areas such as busy town, cities, businesses, testing procedures and actual time in testing has been reduced by 50%, by reducing the time in testing more pumps can be tested in a single day, by reducing the time required to conduct the testing, up to approximately 50% of the water usage can be saved, making this unit 'green'.

The invention has been described with references to a preferred embodiment. While specific values, relationships, and materials have been set forth for purposes of describing concepts of the invention, it will be appreciated by persons skilled in the art that numerous variations and/or modifications may be made to the invention as shown in the specific embodiments without departing from the spirit or scope of the basic concepts and operating principles of the invention. It should be recognized that, in the light of the above teachings, those skilled in the art can modify the specifics without departing from the invention taught herein. Having fully set forth the preferred embodiments and certain modifications of the concept underlying the present invention, various embodiments as well as certain variations and modifications of the embodiments herein shown and described will obviously occur to those skilled in the art upon becoming familiar with such underlying concept. It is intended to include all such modifications, alternatives and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

What is claimed is:

1. An apparatus for full capacity flow of a stream of high pressure fluid comprising:

at least one fluid conduit having a first end and a second end;

a pitotless nozzle connected to a first end of the at least one fluid conduit such that fluid passing through said at least one fluid conduit also passes through said pitotless nozzle, said pitotless nozzle further comprising a gauge port;

a diverter tank having an open bottom, said tank being configured to receive the fluid passing through said at least one fluid conduit and said pitotless nozzle; and a test header connected to the second end of said at least one fluid conduit, said test header comprising at least one valve to control the flow of fluid through said at least one fluid conduit, and at least one gauge connection attached to said gauge port of said pitotless nozzle, wherein said test header is remote from said diverter tank.

2. The apparatus of claim 1 wherein said apparatus is mounted on a trailer.

3. The apparatus of claim 1, said diverter tank further comprising a plurality of flow diffusers.

4. The apparatus of claim 3 wherein said flow diffuser is mounted inside said diverter tank.

5. The apparatus of claim 4 wherein said flow diffuser is mounted in the path of flow of fluid from said pitotless nozzle.

6. The apparatus of claim 3, said flow diffuser further comprising an arrow-shaped head.

7. The apparatus of claim 6, said flow diffuser further comprising a mesh screen.

8. The apparatus of claim 1, said fluid conduit comprising:

a first section having a first diameter;

a second section having a second diameter larger than said first diameter; and a third section having a third diameter smaller than said second diameter.

9. The apparatus of claim 8 wherein said first diameter is approximately 2½ inches.

10. The apparatus of claim 8 wherein said second diameter is approximately 4 inches.

11. The apparatus of claim 8 wherein the first diameter and the third diameter are approximately equal.

12. The apparatus of claim 8 wherein said pitotless nozzle has a diameter matching the third diameter.

13. The apparatus of claim 8 comprising an eccentric expander between said first section and said second section.

14. The apparatus of claim 8 comprising an eccentric reducer between said second section and said third section.

15. The apparatus of claim 1 further comprising a gauge line between said gauge port of said pitotless nozzle and said test header.

16. The apparatus of claim 1 further comprising an insert between said pitotless nozzle and said diverter tank.

* * * * *